United States Patent [19]

Sadler

[11] Patent Number: 4,651,970

[45] Date of Patent: Mar. 24, 1987

[54] VALVE ACTUATOR WITH AUXILIARY ENERGY STORAGE MEANS

[75] Inventor: David R. Sadler, Houston, Tex.

[73] Assignee: Joy Manufacturing Company, Pittsburgh, Pa.

[21] Appl. No.: 882,872

[22] Filed: Jul. 7, 1986

[51] Int. Cl.[4] ............................................ F16K 31/122
[52] U.S. Cl. ..................................... 251/63.6; 74/531; 92/23; 92/130 A; 251/297
[58] Field of Search ............................... 74/527, 531, 569; 92/23, 130 A; 251/62, 63, 63.4, 63.6, 77, 297

[56] References Cited

U.S. PATENT DOCUMENTS

| | | | |
|---|---|---|---|
| 2,733,729 | 2/1956 | Wolfe | 251/297 |
| 4,073,466 | 2/1978 | Snyder | 251/63.4 |
| 4,182,369 | 1/1980 | Akkerman | 251/63.4 |
| 4,309,022 | 1/1982 | Reinicke et al. | 251/63.6 |
| 4,372,333 | 2/1983 | Goans | 251/63.4 |
| 4,480,531 | 11/1984 | Mylius | 92/130 A |
| 4,526,194 | 7/1985 | Miller | 251/297 |
| 4,601,457 | 7/1986 | Austin et al. | 92/130 A |

*Primary Examiner*—George L. Walton
*Attorney, Agent, or Firm*—Marvin J. Marnock

[57] ABSTRACT

A fluid-powered actuator assembly 10 for gate valves 13 having a slab gate 21 with a port 22 adapted to be placed in registry with the flow passage through the valve wherein the valve is moved to open position by application of fluid pressure to the actuator piston 18 and moved to closed position by a piston return spring 33 when the pressure is removed. The assembly includes an auxiliary energy storage device 40 in the form of a coiled spring 41 which is compressed in the initial stages of the actuator stroke to open the valve 13 and is maintained in the compressed energized state by a releasable latch mechanism 52 which latches to the auxiliary spring housing 42. When the actuator 12 operates to close the valve, the auxiliary coiled spring 41 is released near the end of the valve-closing stroke to provide additional axial thrust to the actuator shaft 17 and the valve gate 21 of a magnitude sufficient to shear wire lines 25 or other members which have been inserted through the gate port. The auxiliary energy storage device 40 may be packaged as a cartridge and universally mounted on various sizes and models of piston-type actuators.

5 Claims, 8 Drawing Figures

VALVE ACTUATOR WITH AUXILIARY ENERGY STORAGE MEANS

BACKGROUND OF THE INVENTION

This invention relates to a fluid powered actuator assembly for valves which are moved to the open position by application of fluid pressure to an actuator piston and are moved to the closed position by the relaxation of compressed return springs of the actuator, and more particularly to an actuator assembly for valves for effecting the shearing of wire lines or similar obstructions disposed through the valve opening.

With wellhead assemblies associated with oil and gas wells, it is oftentimes necessary to suspend wire lines, power cables, or tubing through the wellhead for supplying electrical power to downhole equipment, or for chemically treating production zones, or to perform other services. Typically, such lines or tubing are passed through a valve of the wellhead assembly or through a downhole safety valve controlled by a controls system located at the surface. In the event of an emergency, however, it may be urgently required that the well be immediately shut in. Consequently, the various wire lines, tubing, and other suspension members passing through the opening of the valve must be cut in order to quickly shut in the well.

Typically, such valves are actuated to their open position through the application of a control fluid pressure to the piston of a piston-type actuator. Also, the stroke of the actuator to open the valve compresses one or more return springs which are installed in the actuator to provide a mechanical means of returning the valve to its closed position without reliance on fluid control lines.

The force required to shear the wire lines, cables or tubing passing through the valve is frequently considerably greater than that required of an actuator piston return spring for merely closing the valve. In addition, during the return stroke, the thrust force of the piston return spring diminishes rapidly from its initial value so that the available force for severing wire lines, etc., is less than half the initial thrust. Accordingly, it is desireable to provide a mechanism which will provide an additional closing thrust to the actuator shaft as it approaches the fully closed position of the valve so as to avoid the necessity for developing very powerful, very large sized actuators capable of wire line shearing operations. One such apparatus is disclosed in U.S. Pat. No. 4,372,333 wherein a plurality of energy storing devices are radially disposed with respect to the actuator shaft and are energized to an energy storing condition by a cam surface on the actuator shaft during its initial movement in the valve opening direction. When the actuator shaft is returned in the reverse direction to close the valve by the piston return spring, the energy stored in the energy storage devices is released as additional axial thrust on the actuator shaft toward the valve closed position. However, it is difficult to achieve an additional thrust of sufficient magnitude to sever the larger sized workover lines and tubing without greatly enlarging the actuator itself. In addition, every actuator model incorporating such energy storage devices must be specifically designed for their accommodation, and the energy storage devices intended therefor must also be differently sized and varied in number.

Accordingly, it is an object of the invention to provide an actuator assembly having an auxiliary energy storage device which can be universally used with a wide variety of piston-type actuators of many different sizes used in valve operation to provide additional thrust to the actuator shaft during its return stroke as it approaches the closed position of the valve.

Another object is to provide an actuator assembly for operation of a gate valve having a flow port through the gate element thereof, which assembly comprises an auxiliary energy storage device of the coiled spring variety which is readily energized during the valve opening stroke of the actuator shaft and releasably maintained in the energized condition until its release during the return stroke of the actuator shaft to provide additional thrust to the actuator shaft sufficient to sever large sized wire lines or other suspension members passing through the flow port of the valve gate.

A further object is to provide a piston-type actuator for a ported gate valve with an auxiliary storage device to provide large additional thrust to the actuator shaft towards the end of its return stroke sufficient to sever large tubing, cables or other suspension members which are passed through the opening of the valve gate and wherein the auxiliary storage device is a small fraction of the weight of the actuator itself or a conventional piston-type actuator capable of supplying the same thrust force during its return stroke.

SUMMARY OF THE INVENTION

The invention is a fluid-powered actuator assembly and auxiliary energy storage device which is adapted for operation of slab gate valves of the type having a gate with a port therethrough which is in registry with the flow passage through the valve when the valve is in the open condition. The assembly includes an auxiliary energy storage device in the form of a coiled spring which is contained in a spring canister adapted to be operatively connected to the actuator shaft. The auxiliary coiled spring is compressed during the initial stages of the actuator stroke in the valve-opening direction and is maintained in the compressed energized state by a plurality of releasable latch mechanisms which latch to the spring canister. When the actuator operates to close the valve by action of the piston return spring, the latch mechanisms are unlatched near the end of the valve closing stroke to release the auxiliary spring to provide additional axial thrust to the actuator shaft and the valve gate of a magnitude sufficient for the valve gate to shear wire lines or other members which have been inserted through the gate port. The auxiliary energy storage device includes a shaft assembly which connects to the actuator shaft and is controlled thereby to effect the operation of the releasable latch mechanisms. The auxiliary storage device is packageable as a cartridge adapted for operation without modification on a variety of models and sizes of actuators.

BRIEF DESCRIPTION OF THE DRAWINGS

In the accompanying drawings which form part of the specification and are to be read in conjunction therewith.

DESCRIPTION OF A PREFERRED EMBODIMENT

Figure 1:
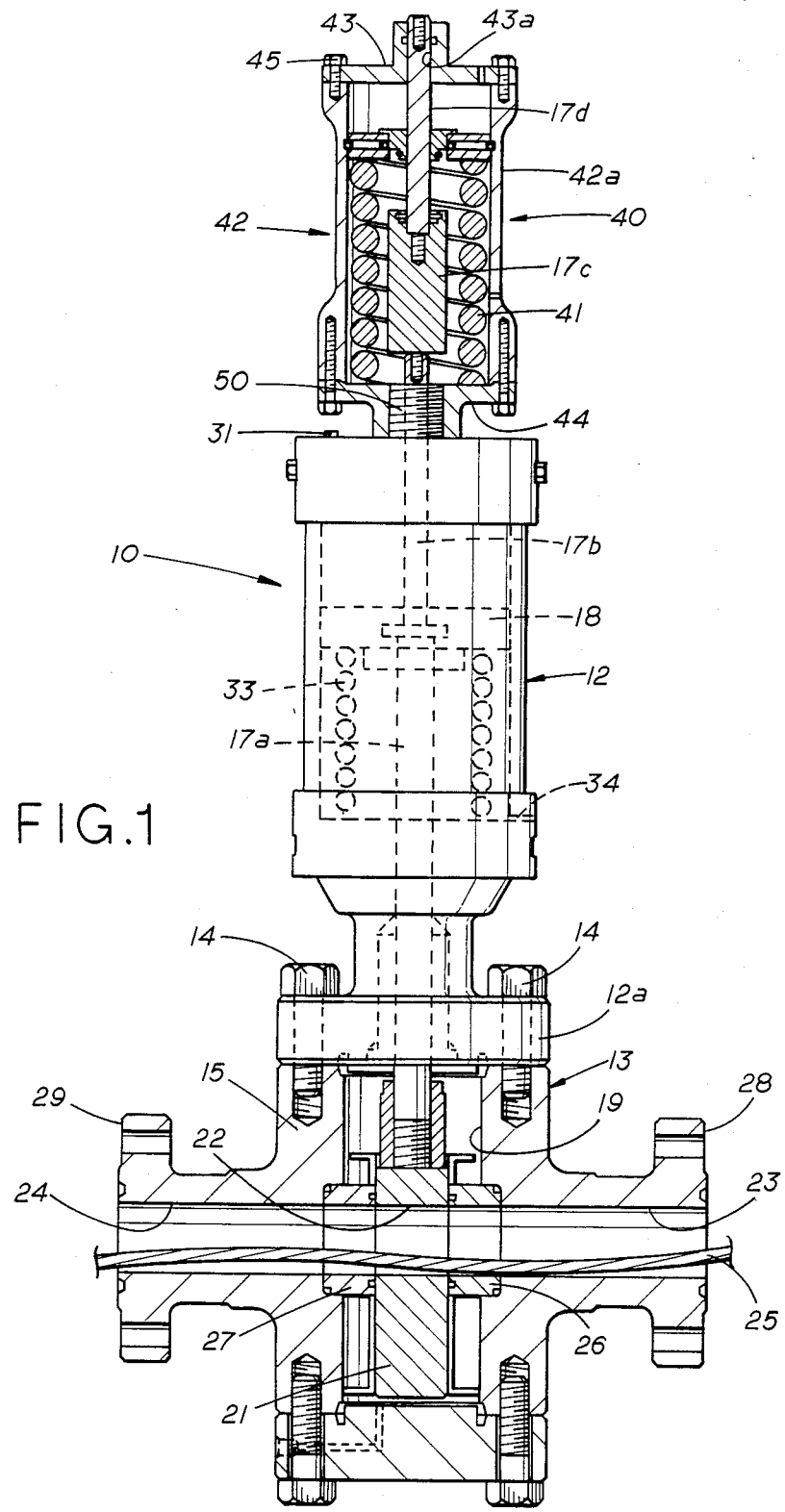
FIG. 1 is a longitudinal view, partly in section, of a fluid powered actuator assembly operatively connected to a gate valve for cutting wire lines or other suspension members traversing the opening through the valve member in accordance with a preferred embodiment of the invention.

Referring to the drawings in greater detail, there is shown in FIG. 1 an actuator assebmnly 10 representing an embodiment of the invention which is operatively connected to a gate valve 13 which may be forcefully closed to shut in a well and to shear off any tubing, cables, wires, or other suspension members which are passed through the valve opening into the bore of the well. In accordance with the invention, a piston-type actuator 12 is shown mounted to a slab type gate valve 13 by means of bolts 14 threaded through a base flange 12a of the actuator 12 into accommodating threaded bores in the valve body 15. The actuator 12 is a conventional fluid-powered actuator of the piston type, either hydraulic or pneumatic, having an actuator shaft 17 affixed by a suitable connection to the actuator piston 18. The actuator shaft 17 extends through the actuator housing and a central opening in the bore flange 12a into the valve chamber 19 of the gate valve 13 where it is connected to the slab gate element 21 of valve 13 by means of threads on the end of the actuator shaft cooperatively engaged with internal threads of a bore provided at one end of the slab gate 21. As is well known, the gate 21 is disposed in the valve chamber 19 and is adapted for reciprocating movement therein to open or close the valve. As shown in FIG. 1, the gate 21 has been positioned by the actuator in the valve open position wherein a port 22 through the gate 21 is disposed in registry with the inlet and outlet, flow passages 23, 24 provided in the valve body. The gate 21 is adapted for sliding movement between a pair of valve seat rings 26, 27 which are press fit into seat pockets provided in the valve body at opposite sides of the valve chamber 19 and cooperate with the gate 21 to block the flow passage of the valve when the gate is in its closed position.

In a typical installation, the valve 13 is mounted in a wellhead assembly where its flanged ends 28, 29 may be connected to a wellhead outlet and a flow line or connected so that the valve opens or closes the wellhead bore. A wire line 25 is shown extending through the valve inlet 23, gate port 22, and valve outlet 24 which provide an open flow way through the valve 13 in its fully open position.

The actuator 12 is activated by the input of fluid pressure, either hydraulic or pneumatic, through an input port 31 which is connectable in fluid communication to a source of fluid pressure (not shown). The input of pressurized fluid at one end of the actuator results in an application of fluid pressure to the face of the piston 18 which sealingly engages the internal wall 32 of the actuator housing. The piston 18 is thereby driven downwardly against the biasing force of a piston return spring 33 which is positioned against the end of the actuator connecting to the gate valve and engages the piston on the side opposite its pressure receiving face to apply force which constantly urges the piston upwardly as viewed in FIG. 1. The downward movement of the piston and actuator shaft 17 attached thereto drives the gate 21 of valve 13 downwardly to the valve open position. So long as fluid pressure is applied through the input 31 to the face of the piston 18, the valve remains open.

To close the valve 13, fluid pressure is removed from the pressure face of the piston 18 by bleeding of fluid from the top end of the actuator whereby the spring 33 drives the piston upwardly together with the actuator shaft 17 and the valve gate 21. At the end of the upward stroke of the piston, the gate 21 is at an upper position (not shown) wherein the port 22 of gate 21 is no longer in fluid communication with the flow passage 23, 24 of the valve and the gate 21 blocks the flow passages 23, 24 to close the valve.

While the actuator 12 is of a size to insure the opening and closing of the valve 13, the thrust of the piston return spring 33 may be inadequate to accomplish the severing of tubing, cables, or wire lines which may have been run and suspended through the flow way of the valve 13 which includes the gate port 22. Should an emergency arise requiring that the well be immediately shut in, there is usually insufficient time to withdraw such wire lines or other suspended members and they must therefore be severed in order to quickly shut in the well.

To provide additional thrust during the return stroke of the actuator piston sufficient to permit the sharp edges about the port 22 of the gate 21 to cut a wire line or other suspension member, an auxiliary energy storage device 40 is provided which is energized during the valve opening stroke of the actuator and releases stored energy to increase axial thrust of the actuator at the critical instant during the actuator return stroke when it must sever any lines traversing the valve flow way. The auxiliary energy storage device 40 comprises a helically coiled spring 41 which is housed within a canister 42. The canister 42 is closed at one end with an end plate 43 and at its other end with an end plate 44, both of which are bolted to the ends of the tubular canister housing 42a by means of bolts 45 and 46, respectively.

The plate 44 has a centrally located boss 48 which is provided with a threaded axial bore 48a extending coaxially therethrough whereby the canister 42 is attached to the top end of the actuator 12 as shown in FIG. 1 by threading of the end plate 44 onto an externally threaded boss 50 provided on the top of the actuator 12. The boss 50 is also provided with a central opening which receives an extension 17b of the actuator shaft. The shaft extension 17b is connected to the piston 18 in any suitable fashion as by a threaded bore connection, or the like, in alignment with the shaft section 17a. The shaft extension 17b extends into the canister 42 where it is threadedly connected to one end of an enlarged diameter shaft segment 17c. The large diameter shaft segment 17c is also joined to a further shaft extension 17d, a threaded end of which is received in a threaded blind bore at the top end of the shaft segment 17c. The shaft extension 17c extends through a central opening 43a provided in the end plate 43 of canister 42. It is to be noted that all of the actuator shaft components comprising extensions 17a, 17b, 17c and 17d are connected in coaxial alignment.

Figure 3:
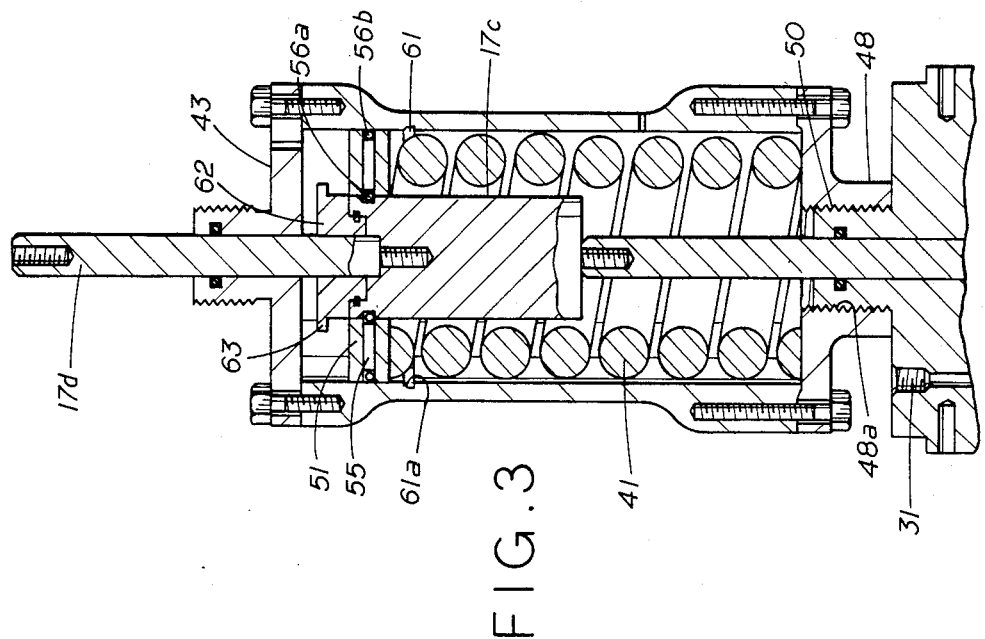
FIG. 3 is a view similar to FIG. 2 but showing the auxiliary energy storage device in the deenergized condition after the valve has been returned to its valve closed position and the wire lines or other suspension members have been severed.
Figure 2:
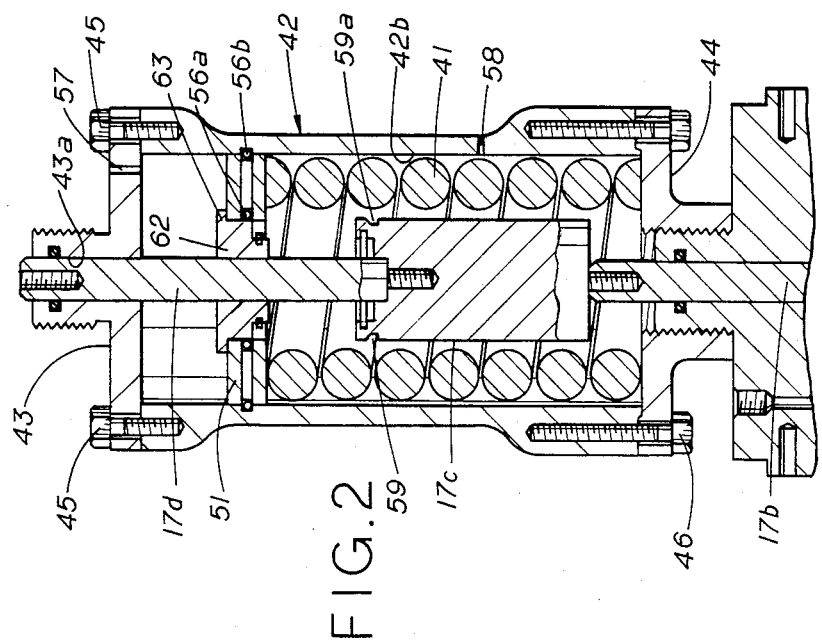
FIG. 2 is a fragmentary sectional view showing an energized auxiliary storage device of the invention mounted atop a conventional fluid-powered actuator which has been actuated to the valve open position.
Figure 4:
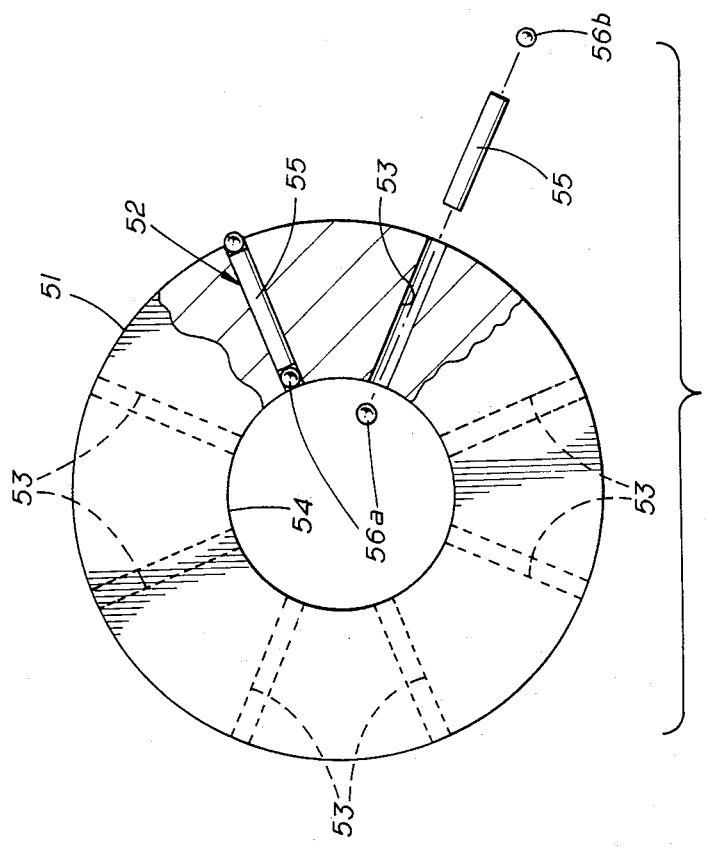
FIG. 4 is a plan view partly in radial section of the housing member for the plurality of ball-latch mechanisms for releasably maintaining the spring of the auxiliary energy storage device of the invention in its energized compressed condition, and showing one of the ball-latch mechanisms in exploded view.

The coiled spring 41 is disposed in the canister 42 about the shaft components 17b, 17c, and 17d in coaxial relation therewith. As best seen in FIGS. 2 and 3, one end of the spring 41 abuts the inner surface of the end plate 44 and its other end is disposed in abutting engagement with the underside of an annular spring retainer or spring guide disc 51. The disc 51 is also a housing for a plurality of latching mechanisms 52, each of which is adapted to releasably latch the shaft segment 17c to the spring retainer disc 51 and also releasably latch the spring retainer disc 51 to the inner wall 42b of the canister housing 42a. In FIG. 4, it is shown that the spring retainer disc 51 is provided with a plurality of radially extending guide bores 53 which extend from the outer periphery of the disc to its inner periphery which defines the central opening 54 of the disc. In each of the guide bores 53, is disposed a latching plunger 55 and a pair of latching balls 56a, 56b, one disposed at each end of the plunger 55. It is to be noted that the longitudinal dimension of the plunger 55 added to the diameters of the two balls 56a, 56b is slightly larger than the axial dimension of the radial bore 53 in which they are received. As will be hereinafter described, the outer ball 56b of a latching mechanism 52 is adapted to releasably latch with the inner wall 42b of the canister housing and the inner ball 56a of the latching mechanism is adapted to releasably latch with the shaft segment 17c.

When the gate valve 13 is in the closed condition, the actuator piston 18 and valve gate 21 are raised from the positions shown in the valve open condition of FIG. 1. Likewise, the actuator shaft 17 and all its components are disposed upwardly from the shaft position of FIG. 1 to where the shaft extension 17d extends upwardly through the top end of the canister 42 as shown in FIG. 3. Also, the piston return spring 33 of actuator 12, and the coiled spring 41 within canister 42 are both in relaxed uncompressed state. The spring retainer disc 51 is latched to the shaft segment 17c by the plurality of balls 56a which are received in a circumferential annular groove 59 which is provided about the shaft segment 17c near its upper end. The depth of the groove 59 is approximately equal to the radius of a ball 56a so that in the latched condition shown in FIG. 3, half of ball 56 is received in groove 59 and half is disposed in bore 53. Accordingly when pressurized fluid is input to the actuator 12 to open the valve 13, the piston 18 and actuator shaft 17 are driven downwardly and the canister spring 41 is compressed during the initial phase of the stroke of the actuator shaft to the position shown in FIG. 2 wherein it stores potential energy.

The spring 41 is retained in compressed condition by the retainer disc 51 which releases from the shaft segment 17c and simultaneously latches to the inner wall of the canister 42 at a predetermined distance from its position at the time of initiation of the actuator stroke. This occurs by the camming action of the upper tapered surface 59a of the shaft groove 59 on the balls 56a which drives each of them radially outward into the radial bores 53 which also drives their associated plungers 55 and outer balls 56b in the radial outward direction to where the balls 56b are partly received in an internal groove 61 which extends about the interior of the inner wall 42b of the canister 42. A ball retainer collar 62 which is sleeved loosely about shaft extension 17d is adapted to retain the balls 56a wholly within the bores 53 and thereby maintain the spring 41 in its compressed energized condition. The retainer collar 62 is provided with an external diameter which corresponds to that of shaft segment 17c and the central opening 54 of retainer disc 51. In the relaxed deenergized condition of coiled spring 41, the retainer collar 62 seats atop the shaft segment 17c, and is releasably latched thereto by a latch ring 64a carrried on shaft segment 17c, but as the actuator shaft moves downwardly to open the gate valve 13, the collar 62 is received in the central opening 54 of spring retainer disc 51. With the spring retainer disc 51 latched to the inner wall 42b of canister 42, the exterior cylindrical surface of the collar 62 engages and retains the balls 56a in the bores 55. It is prevented from passing through the central opening 54 of disc 51 by an external flange 63 provided on its upper end which is of larger diameter than the disc opening 54 whereby the underside of the flange 63 provides a shoulder which seats atop the retainer disc 51. As the actuator shaft continues its downward valve opening stroke, the latch ring 64a unlatches from retainer collar 62.

As previously stated, the compression of the canister spring 41 occurs during the initial stages of the actuator stroke which opens the gate valve 13 and the spring 41 is retained in the compressed condition where it stores energy adapted to be released in the form of additional axial thrust of the actuator shaft in the valve closing direction. The retainer disc 51 does not sealingly engage the internal wall 42a of canister 42. However, to insure its freedom of movement within the canister 42, a bleed port 57 is provided through the end plate 43 of canister 42 and another bleed port 58 is provided in the side of the canister 42 at a location below the spring retainer disc 51 whereby air may be readily bled from or admitted into the canister housing as the spring retainer disc 51 moves therein.

Figures 5, 6:
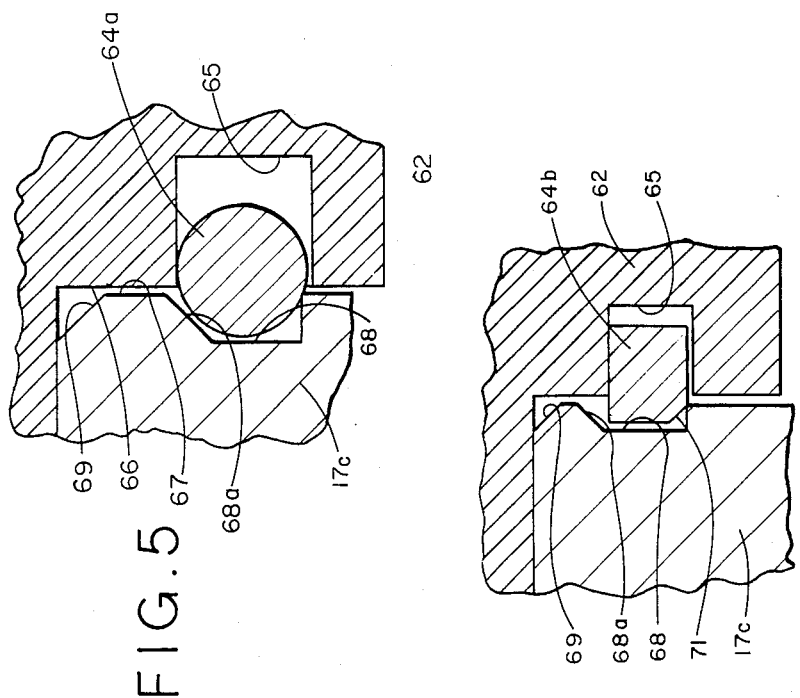
FIG. 5 is an enlarged fragmentary sectional view showing details of the ring-latch for latching a ball retainer collar to an extension of the actuator shaft in the condition wherein the auxiliary energy storage device is in the deenergized state.
FIG. 6 is an enlarged fragmentary sectional view similar to FIG. 5, but showing an alternative form of ring-latch.

Details of the releasable latching connection between the ball retainer collar 62 and the shaft segment 17c by means of latch ring 64a are shown in FIG. 5. This connection is to insure that no matter what the orientation of the actuator assembly, whether vertical or otherwise, the ball retainer collar 62 will be latched to the shaft segment 17c and move therewith as the shaft begins the valve opening stroke. The ring 64a is of circular radial cross section and is severed across such a radial cross-section creating a gap in its circumference to permit its contraction and expansion. It is carried in an annular groove 65 in the cylindrical wall 66 of the retainer collar 62. In relaxed expanded condition, as appears in FIG. 5, the ring 64a is also received in an external groove 68 formed in a cylindrical wall 67 of a blind bore formed in the top of the shaft segment 17c to thereby latch the collar 62 to the shaft segment 17c. When the ball latch mechanisms 52 latch to the inner wall 42b of the canister during the valve opening stroke of the actuator, the shaft segment 17c continues downward from its position shown in FIG. 5, and the inclined surface 68a of groove 68, cams the ring 64a temporarily into groove 65 of collar 62 to release the retainer collar 62 from the shaft 17c. On the valve closing stroke, an annular bevelled surface 69 about the blind bore of shaft segment 17c, again cams the latch ring 64a into the groove 65 where it remains until groove 68 of the shaft 17c moves adjacent whereupon the ring 64a expands therein to relatch the collar 62 to shaft 17c.

An alternative form of latch ring is shown in FIG. 6 wherein a latch ring 64b is provided with a generally rectangular cross section but with a lower bevelled surface 71 on its outer exterior which facilitates its being cammed into the groove 65 by the bevelled surface 69 in the shaft segment 17c when the shaft moves in the valve closing stroke.

When it is desired to close the gate valve 13, pressurized fluid is exhausted from the actuator 12 and the actuator piston 18 and shaft 17 are driven upwardly by the piston return spring 33. When the valve gate 21 approaches the valve closed position, wherein the sharp edges of the gate 21 about the gate port 22 engage a wire line 25 or other member suspended through the valve, the further upward movement of the shaft segment 17c lifts the ball retainer collar 62 from the opening 54 of the disc 51 and the ball latching mechanisms 52 operate to release the spring retainer disc from the canister wall and thereby the coiled spring 41 from its compressed state. Release of the latching mechanisms 52 is accomplished when the upper end of the shaft segment 17c enters the central opening 54 vacated by the collar 62 and the external groove 59 is adjacent the balls 56a. Since the balls 56b are biased radially inwardly by cooperation of spring 41 and the tapered camm surface 61a of groove 61 in the canister wall, the plungers 55 and balls 56a are received in the shaft groove 59 and thereby latch the retainer disc 51 to the shaft segment 17c while simultaneously releasing the disc 51 from the canister wall. Additional axial thrust provided by the release of the canister spring 41 is thereby imparted to the actuator shaft 17 which boosts the total thrust of the actuator shaft to a magnitude sufficient for the valve gate 21 to sever tubing, cables, or wire lines.

Figure 8:
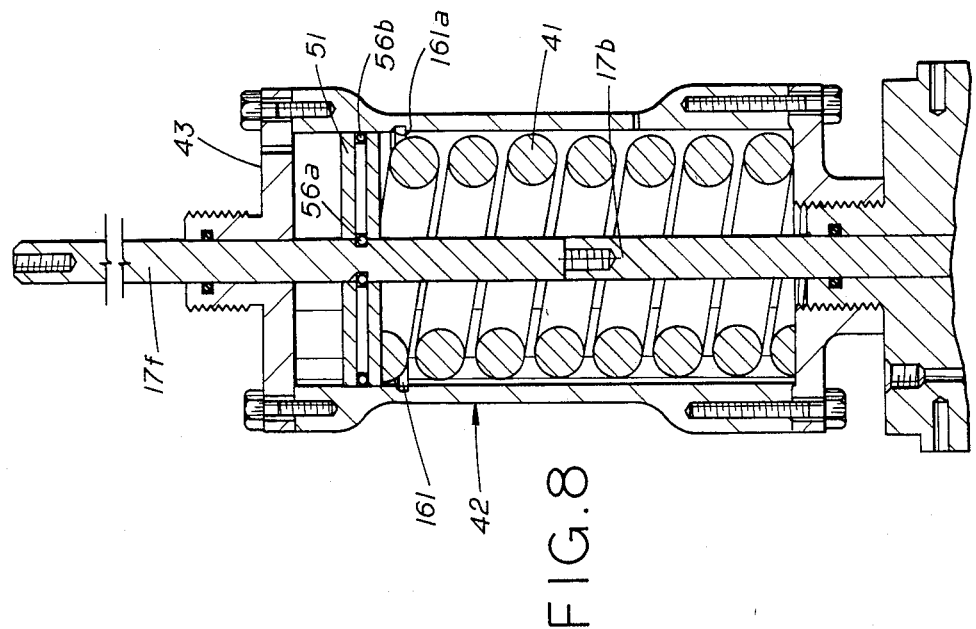
FIG. 8 is a view similar to FIG. 7 but showing the auxiliary storage device in the deenergized condition after the valve has been closed and the wire lines or other suspension members have severed.
Figure 7:
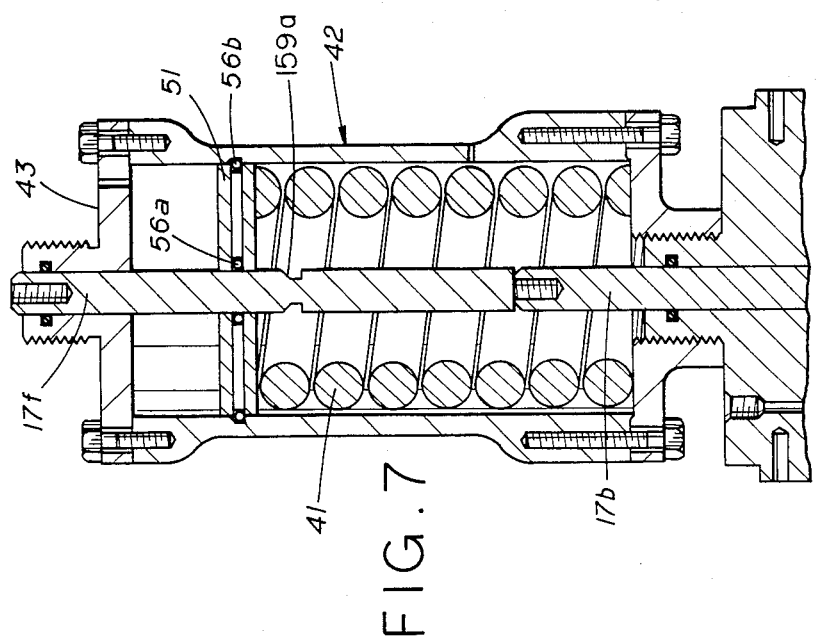
FIG. 7 is a longitudinal sectional view of a further embodiment of the energy storage device as it appears in the energized state and the actuator and valve connected therewith are in the valve open position.

A modified form of the invention is illustrated in FIGS. 7 and 8. In this embodiment, the shaft segment 17c, shaft extension 17d, and ball retainer collar 62 of the appartus shown in FIGS. 1 through 3 are replaced by a single shaft extension 17f. The shaft extension 17f and central opening 54 of the spring retainer disc 51 are designed with corresponding diameters whereby the shaft extension 17f extends through the disc 51 whifh is sleeved in close slidable engagement thereabout. A groove 159, corresponding to groove 59 in the embodiment of FIG. 1 is formed about the shaft extension 17f and is adapted to receive the inner balls 56a of the plurality of latching mechanisms 52 when the auxiliary energy storage device is in the relaxed deenergized state corresponding to the valve closed position as shown in FIG. 8. A groove 161 corresponding to groove 61 of the embodiment of FIG. 1, is provided in the inner wall of the canister 42 and is adapted to receive the balls 56b of the plurality of latching mechanisms 52 to releasably latch the spring retainer disc 51 to the canister wall when the gate valve 13 is in the open condition and the coiled spring 41 is in its compressed energy storing state. A camming surface 161a is provided as an upper side of the groove 161 to cam the latching mechanisms radially inward as the actuator shaft moves upwardly in the valve closing direction. A similar camming surface 159a, provided as an upper sie of the groove 159 on shaft extension 17f, cams the latching mechanisms radially outward as the actuator shaft moves downwardly in the valve opening direction.

It is to be appreciated therefore, that a valve actuator assembly is disclosed herein which includes an auxiliary energy storage device which is particularly adapted to provide additional axial thrust to the actuator shaft as it approaches the end of its return stroke. As an example, a canister spring 41 might be provided which will supply a thrust of 16000 lbs or move to be added to the declining thrust of the piston return spring 33 which might only supply an initial thrust in the range of 2700 lbs. Such a large boost in the axial thrust of the actuator shaft 17 will suffice to permit the valve gate 21 to sever tubing or wire lines when the actuator moves to close the valve.

The auxiliary energy storage device 40 may be universally used with a wide variety of piston-type actuators, of different sizes and models. The actuator, itself, may be either hydraulic or pneumatic. The end plate 44 of the canister 42 may be designed to connect to the threaded bosses of many models in a line of actuators or, alternately, an adapter might be provided to accommodate its connection to an odd size. The auxiliary storage device 40 is particularly designed for use with a valve to shear wire lines and the like but it could, of course, be used as a means of quickly closing a valve without the need of using a very large sized piston actuator. An auxiliary storage device weighing 150 lbs, for example, would avoid the need for a larger piston-type actuator which might weigh several hundred pounds more than the original and require far more space.

It is also to be understood that the foregoing description of a preferred embodiment of the invention has been presented for purposes of illustration and description and is not intended to limit the invention to the precise form disclosed. For example, the releasable latching mechanisms for releasably latching the spring retainer disc to the shaft 17 and to the inner wall of the canister housing 42a may be other than shown herein. The balls 56a, 56b could be replaced as rounded ends of the plunger 55. The auxiliary coiled spring 41 might be replaced with a plurality of springs either arranged coaxially with the shaft extensions 17c, 17f or arranged symmetrically thereabout. It is to be appreciated therefore that changes may be made by those skilled in the art without departing form the spirit of the invention.

What is claimed is:

1. A fluid pressure actuator for controlling a gate valve having a slab gate with a port therethrough which is disposed in registry with the flow passage through the valve in the valve open position, said actuator includes a cylinder and a piston therein with an actuator shaft connected to the actuator piston and to the valve gate wherein application of fluid pressure moves the shaft of the actuator in the valve opening direction to open the valve and a piston return spring returns the shaft in the valve closing direction to close the valve on removal of said pressure;

an auxiliary energy storage means, independent of said fluid pressure actuator which is removably mounted to said cylinder externally thereof and connectable to said actuator shaft, said storage means comprising a coiled spring independent of the piston return spring which is compressible by valve opening movement of the actuator shaft for storing energy during the valve opening stroke of the actuator shaft and is releasable near the end of the valve closing stroke for supplying additional axial thrust to the actuator shaft and slab gate of a magnitude sufficient to shear a wire line or other member traversing the valve opening and said energy storage means being adapted to be removed for utilization with a wide range of different size fluid pressure actuators.

2. A fluid actuator as set forth in claim 1 wherein the auxiliary energy storage means comprises a canister, a shaft extension member extending through said canister and having connecting means at one end for accommodating its connection in coaxial alignment with said actuator shaft, and said auxiliary coiled spring is disposed within said canister in coaxial or axis parallel relation with the shaft extension member, a spring retainer guide in abutting engagement with one end of the auxiliary coiled spring and the other end of the spring in abutting engagement with said canister;

and means for releasably latching the spring retainer guide to said shaft extension when the actuator shaft and gate valve are in the valve open position whereby the auxiliary coiled spring is compressed by the spring retainer guide during the valve opening stroke of the actuator shaft and the spring retainer guide is simultaneously released from the shaft extension and releasably latched to the canister at a predetermined instant during the valve opening stroke to thereby maintain the auxiliary coiled spring in the compressed state so long as the valve remains open, said releasable latching means being operable to unlatch from the canister during the valve closing stroke of the actuator shaft and release said auxiliary coiled spring to provide additional thrust to the actuator shaft and valve gate.

3. A fluid actuator as set forth in claim 2 wherein the auxiliary energy storage means is packaged as a cartridge suitable for connection to piston-type actuators of various models and sizes.

4. A fluid actuator as set forth in claim 2 wherein the means for releasably latching the spring retainer guide comprises a plurality of latching mechanisms arranged in symmetrical radial array about said shaft extension member, each said latching mechanism comprising a plunger assembly, an external groove and a cam surface of said groove on said shaft extension member for camming the plunger radially outward as the shaft moves in the valve opening direction, and an internal groove and cam surface on the inner wall of the canister for camming the plunger radially inward into said external groove to release from the canister and to latchingly engage the shaft extension member during the valve closing stroke.

5. A fluid actuator as set forth in claim 4 wherein each plunger assembly of a releasably latching mechanism includes an elongate plunger, a ball element engaged with the inner end of the plunger and a ball element engaged with the other end of the plunger, whereby the ball elements are cooperative with said camming surfaces of the shaft extension member and the inner wall of the canister for driving the plunger assembly radially inward to latch to the shaft extension member and alternatively radially outward to latch to the canister.

* * * * *